(12) United States Patent
Inoue et al.

(10) Patent No.: US 8,401,351 B2
(45) Date of Patent: Mar. 19, 2013

(54) 90-DEGREE HYBRID

(75) Inventors: Takashi Inoue, Tokyo (JP); Kazutaka Nara, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 13/409,556

(22) Filed: Mar. 1, 2012

(65) Prior Publication Data

US 2012/0224812 A1 Sep. 6, 2012

Related U.S. Application Data

(63) Continuation of application No. PCT/JP2010/065223, filed on Sep. 6, 2010.

(30) Foreign Application Priority Data

Sep. 4, 2009 (JP) .................................. 2009-204971

(51) Int. Cl.
*G02B 6/26* (2006.01)
*G02B 6/42* (2006.01)

(52) U.S. Cl. ................ 385/45; 385/14; 385/42; 359/325

(58) Field of Classification Search .................... 385/14, 385/42, 45; 359/325; 398/65
See application file for complete search history.

(56) References Cited

U.S. PATENT DOCUMENTS

| | | | |
|---|---|---|---|
| 5,359,412 A * | 10/1994 | Schulz | ........................... 356/478 |
| 7,813,032 B2 | 10/2010 | Hasegawa et al. | |
| 7,884,996 B2 | 2/2011 | Hasegawa | |
| 7,961,991 B2 | 6/2011 | Hasegawa et al. | |
| 7,978,401 B2 | 7/2011 | Hasegawa et al. | |
| 2002/0018622 A1 | 2/2002 | Kashihara et al. | |
| 2007/0177151 A1 * | 8/2007 | Isomura et al. | ............... 356/477 |
| 2009/0087194 A1 | 4/2009 | Nakashima et al. | |
| 2011/0110622 A1 | 5/2011 | Akutsu et al. | |
| 2012/0014636 A1 | 1/2012 | Nara et al. | |

FOREIGN PATENT DOCUMENTS

| | | |
|---|---|---|
| JP | 2009-89194 | 4/2009 |
| JP | 2010-251851 | 11/2010 |

OTHER PUBLICATIONS

U.S. Appl. No. 13/333,432, filed Dec. 21, 2011, Kawashima, et al.
U.S. Appl. No. 13/336,111, filed Dec. 23, 2011, Kawashima, et al.
International Preliminary Report on Patentability and Written Opinion issued Apr. 11, 2012 in PCT/JP2010/065223 filed Sep. 6, 2010.

(Continued)

*Primary Examiner* — Daniel Petkovsek
(74) *Attorney, Agent, or Firm* — Oblon, Spivak, McClelland, Maier & Neustadt, L.L.P.

(57) ABSTRACT

The present invention provides a 90-degree hybrid capable of miniaturization and also capable of a stable operation in a wide band. According to an embodiment of the present invention, a PLC-type 90-degree hybrid comprises: a PLC chip having a planar lightwave circuit formed therein; and a 90-degree hybrid circuit formed in the planar lightwave circuit, mixing a modulated signal light and an LO light to separate the signal light into quadrature components I and Q, and outputting the same. The 90-degree hybrid circuit includes: two Y-branch couplers each branching the signal light and the LO light; and two wavelength-independent directional couplers which cause LO lights passing through two paths and signal lights passing through two paths to interfere with each other, respectively. The above-described paths include waveguides having mutually inverted shapes and waveguides having an identical shape, and have a shape substantially symmetrical with respect to the signal light.

16 Claims, 7 Drawing Sheets

OTHER PUBLICATIONS

Y. Inoue, et al., "Optical 90° Hybrid Using Silica-Based Planar Lightwave Circuit", 1994 Autumn IEICE Conference, C-259, 2 pages (with Extracted Translation).

Masakaze Hosoya, et al., "A new Packaging Techniqe for an Optical 90° -Hybrid Balanced Receiver Using Planar Lightwave Circuits", IEICE Technical Research Report, Optical Communication System OCS-95, 1995, pp. 49-54 (with English abstract).

Seiji Norimatsu, et al., "An Optical 90° -Hybrid Balanced Receiver Module Using a Planar Lightwave Circuit", IEEE Photonics Technology Letters, vol. 6, No. 6, Jun. 1994, pp. 737-740.

M. Oguma, et al., "Single MZI-Based 1x4 DQPSK Demodulator", ECOC 2007, 2007, 2 pages.

T. Hashimoto, et al., "Dual Polarization Optical Hybrid Module Using Planar Lightwave Circuit", 2009 IEICE Electronics Society Conference, Sep. 1, 2009, C-3-39, p. 194 and 4 pages of English translation.

U.S. Appl. No. 13/364,611, filed Feb. 2, 2012, Inoue.
U.S. Appl. No. 13/409,343, filed Mar. 1, 2012, Inoue, et al.
U.S. Appl. No. 13/445,360, filed Apr. 12, 2012, Kawashima, et al.

\* cited by examiner

US 8,401,351 B2

90-DEGREE HYBRID

CROSS-REFERENCES TO RELATED APPLICATIONS

This application is a continuation application of International Application No. PCT/JP2010/065223, filed Sep. 6, 2010, which claims the benefit of Japanese Patent Application No. 2009-204971, filed Sep. 4, 2009. The contents of the aforementioned applications are incorporated herein by reference in their entities.

TECHNICAL FIELD

The present invention relates to a 90-degree hybrid used in a receiver of a coherent optical transmission system that mixes a signal light and a local oscillation light, e.g., a DP-QPSK modulation system receiver that receives a DP-QPSK signal, or the like.

BACKGROUND ART

A DP-QPSK (Dual Polarization Quadrature Phase Shift Keying) modulation system which multiplexes an X-polarization QPSK signal and a Y-polarization QPSK signal that are obtained by quadrature-phase modulating an X-polarization light and a Y-polarization light with independent information, respectively, is promising as the modulation system for large-capacity signal transmission. In this DP-QPSK modulation system, since the bit rate is 40 Gbit/s when the symbol rate is 10 GSymbol/s and the bit rate is 100 Gbit/s when the symbol rate is 25 GSymbol/s, the frequency utilization efficiency can be increased.

In the DP-QPSK modulation system receiver (DP-QPSK receiver), a DP-QPSK signal is separated into an X-polarization QPSK signal and a Y-polarization QPSK signal by a polarization beam splitter (PBS). Furthermore, using a 90-degree hybrid for X polarization and a 90-degree hybrid for Y polarization, the separated X-polarization QPSK signal and Y-polarization QPSK signal are mixed with a local oscillation light (LO light), respectively. Thus, the phase modulation signal (QPSK signal light) of each polarized wave is converted into an intensity modulation signal, respectively. Then, for the signal light in each polarized wave, the components (I component and Q component) corresponding to a real part and an imaginary part of an electric-field amplitude are independently extracted, when the electric-field amplitude is expressed by a complex number. Note that, the 90-degree hybrid is generally known as a circuit, wherein an input signal light and a local oscillation light are branched into two, respectively, and a 90-degree phase difference is given between the two-branched local oscillation lights as a relative lightwave phase difference, and thereafter one of the two-branched signal lights is mixed with one of the two-branched local oscillation lights and the other one of the two-branched signal lights is mixed with the other one of the two-branched local oscillation lights.

Non-Patent Documents 1 to 3 disclose a 90-degree hybrid which is formed by combining a coupler and a PBS on one planar lightwave circuit (PLC). Moreover, Non-Patent Document 4 discloses a 1×4 DQPSK demodulator including a delay circuit and a 90-degree hybrid formed on a PLC. This 90-degree hybrid circuit is configured as a part of a Mach Zehnder interferometer (MZI), wherein an MMI coupler is used in an input/output section of the MZI.

RELATED ART DOCUMENTS

Non-Patent Document 1: Yasuyuki Inoue, et al., "An Optical 90-degree Hybrid Using a Quartz PLC" 1994 Institute of Electronics, Information and Communication Engineers Autumn Conference, C-259

Non-Patent Document 2: Masakaze Hosoya, et al., "A Technique for Constructing a 90-degree Hybrid Balanced Optical Receiver Module Using a PLC" Institute of Electronics, Information and Communication Engineers, Technical Research Reports, Optical Communication System OCS-95, pp. 49-54

Non-Patent Document 3: S. Norimatsu et al., "An Optical 90-Hybrid Balanced Receiver Module Using a Planar Lightwave Circuit," IEEE Photon. Technol. Lett., Vol. 6, No. 6, pp. 737-740 (1994)

Non-Patent Document 4: M. Oguma et al., "Single MZI-based 1×4 DQPSK demodulator", ECOC2007, 10.3.4 (2007)

SUMMARY OF INVENTION

Generally, a 90-degree hybrid is required to stably operate in a wide band (e.g., CL Band; 1530 to 1620 nm).

However, in the conventional 90-degree hybrid, a difference may occur in the propagation loss and the phase characteristic between two signal lights to be output. Such a difference occurring in the propagation loss or the phase characteristic between two signal lights as the output light of the 90-degree hybrid would lead to instability of the operation of the 90-degree hybrid.

The present invention has been made in view of the above circumstances and aims at providing a 90-degree hybrid capable of a stable operation in a wide band.

A first aspect of the present invention is a 90-degree hybrid, comprising: a PLC chip having a planar lightwave circuit; and a 90-degree hybrid circuit formed within the planar lightwave circuit and mixing a modulated signal light and a local oscillation light to output, the 90-degree hybrid circuit including: a first Y-branch coupler branching the signal light; a second Y-branch coupler branching the local oscillation light; a first coupler causing interference between one of two signal lights branched by the first Y-branch coupler and one of two local oscillation lights branched by the second Y-branch coupler; a second coupler causing interference between the other one of two signal lights branched by the first Y-branch coupler and the other one of two local oscillation lights branched by the second Y-branch coupler; a first path for connecting the first Y-branch coupler and the first coupler and for causing one of the two branched signal lights to propagate therethrough, the first path having at least one bend waveguide and at least one straight waveguide; a second path for connecting the first Y-branch coupler and the second coupler and for causing the other one of the two branched signal lights to propagate therethrough, the second path having the same number of bend waveguides as the first path and the same number of straight waveguides as the first path; a third path for connecting the second Y-branch coupler and the first coupler and for causing one of the two branched local oscillation lights to propagate therethrough; and a fourth path for connecting the second Y-branch coupler and the second coupler and for causing the other one of the two branched local oscillation lights to propagate therethrough; wherein the first path and the second path are configured so as to have the same optical path length, wherein the third path and the fourth path are configured so that an optical path difference between one of the two branched local oscillation lights and the other one of the two branched local oscillation lights becomes 90 degrees in terms of phase, at least one of the bend waveguides of the first path and the bend waveguide of the second path are in a one-to-one correspondence relationship, respectively, and at least one straight waveguide of the first path and the straight waveguide of the second path are in a one-to-one correspondence relationship, respectively, the bend waveguide of the second path has the same shape as or an inverted shape of the bend waveguide of the first path, the both waveguides being in a one-to-one correspondence relationship, and the straight waveguide of the second path has the same shape as the straight waveguide of the first path, the both waveguides being in a one-to-one correspondence relationship.

A second aspect of the present invention is the 90-degree hybrid according to the first aspect, wherein the first coupler and the second coupler are wavelength-independent directional couplers.

The Y-branch coupler is most preferable as the input side coupler of the 90-degree hybrid circuit because it does not have wavelength dependency of the branch ratio and also has a small size as the coupler in addition to a small variation during manufacture. On the other hand, the wavelength-independent directional coupler is most preferable as the output side coupler of the 90-degree hybrid circuit because it has a constant branch ratio with respect to a wavelength and also has a small variation during manufacture. According to this configuration, the Y-branch coupler is used as the input side coupler branching a signal light and a local oscillation light, respectively, and the wavelength-independent directional coupler is used as the output side coupler causing interference between the local oscillation light and the signal light. Therefore, a PLC-type 90-degree hybrid capable of miniaturization and wavelength independence and also capable of a stable operation in a wide band can be realized.

A third aspect of the present invention is the 90-degree hybrid according to the first aspect, wherein the signal light is a QPSK signal, and as the 90-degree hybrid circuit, there are provided: a first 90-degree hybrid circuit which mixes an X-polarization QPSK signal with the local oscillation light to separate the QPSK signal into a component corresponding to a real part of an electric field of the QPSK signal and a component corresponding to an imaginary part thereof to output; and a second 90-degree hybrid circuit which mixes a Y-polarization QPSK signal and the local oscillation light to separate the QPSK signal into a component corresponding to a real part of an electric field of the QPSK signal and a component corresponding to an imaginary part thereof to output.

A fourth aspect of the present invention is the 90-degree hybrid according to the first aspect, wherein at least one path of the first to fourth paths includes a first bend waveguide with a rotation angle $+\theta_1$, a first straight waveguide with a length $l_1$, a second bend waveguide with a rotation angle $-\theta_1$, a second straight waveguide with a length h, a third bend waveguide with a rotation angle $-\theta_2$, a third straight waveguide with a length $l_2$, and a fourth bend waveguide with a rotation angle $+\theta_2$.

According to this configuration, the optical path length of at least one path (the first path) of four paths can be adjusted to any optical path length by adjusting four parameters $\theta_1$, $\theta_2$, $l_1$, and $l_2$ under the condition that the bend radius of each bend waveguide is fixed. Namely, by adjusting four parameters, the optical path length of a path can be freely changed and the degree of freedom in design can be expanded. In particular, under the condition that the bend radius of each bend waveguide is fixed to the optimum value, the optical path length of the path can be freely changed by adjusting four parameters, and therefore the design of 90-degree hybrids corresponding to various kinds of specifications can be facilitated.

A fifth aspect of the present invention is the 90-degree hybrid according to the first aspect, wherein the second path and the third path intersect with each other, and an intersection angle α at which the second path and the third path intersect with each other is set to a range from 60° to 90°. According to this configuration, a loss at the intersection between the second path and the third path can be suppressed.

Sixth aspect of the present invention is the 90-degree hybrid according to the fifth aspect, further comprising two input ports connected to the first and second Y-branch couplers, respectively, wherein the third path and the fourth path have at least one bend waveguide, bend radii of the bent waveguides of the first to fourth paths are the same, and a pitch Pi between the two input ports is uniquely determined by a formula Pi=2r(1−cos α)+Py using the intersection angle α, the bend radius r, and a value of a pitch Py between output waveguides of the first and second Y-branch couplers.

A seventh aspect of the present invention is the 90-degree hybrid according to the first aspect, wherein among the first to fourth paths, a phase trimming heater is disposed in at least one of the third path and the fourth path. According to this configuration, the phase trimming when the phases of the quadrature components I, Q deviate can be made by driving the heater.

An eighth aspect of the present invention is the 90-degree hybrid according to the seventh aspect, wherein in at least one of the first to fourth paths, a straight waveguide with a predetermined length is provided in a part in a section in which the heater is disposed. According to this configuration, a shortage against a given length of the heater can be compensated by the second straight waveguide.

A ninth aspect of the present invention is the 90-degree hybrid according to the third aspect, further comprising: a signaling waveguide for causing a signal light incident upon the 90-degree hybrid to propagate to the first Y-branch coupler; and a local-oscillation light waveguide for causing a local oscillation light incident upon the 90-degree hybrid to propagate to the second branch coupler, wherein the signaling waveguide and the local-oscillation light waveguide intersect with each other, and the first Y-branch coupler and the second Y-branch coupler of the first 90-degree hybrid circuit as well as the first Y-branch coupler and the second Y-branch coupler of the second 90-degree hybrid circuit are arranged in the same order in a predetermined direction.

According to this configuration, in two Y-branch couplers of one of the first and second 90-degree hybrid circuits, as with the other one of the first and second 90-degree hybrid circuits, the signal enters the upper Y-branch coupler and the local oscillation light enters the lower Y-branch coupler, respectively. As a result, the arrangement order of the output light types obtained from the first 90-degree hybrid circuit and the arrangement order of the output light types obtained from the second 90-degree hybrid circuit can be advantageously the same.

A tenth aspect of the present invention is the 90-degree hybrid according to ninth aspect, wherein in order to cancel out a time delay between the X-polarization QPSK signal and the Y-polarization QPSK signal, a waveguide length of each waveguide through which each of the X-polarization QPSK signal and the Y-polarization QPSK signal propagates and a waveguide length of each waveguide through which the local oscillation light propagates are identical, respectively.

According to the present invention, a 90-degree hybrid capable of miniaturization and also capable of a stable operation in a wide band can be realized.

DESCRIPTION OF EMBODIMENTS

Figure 1:
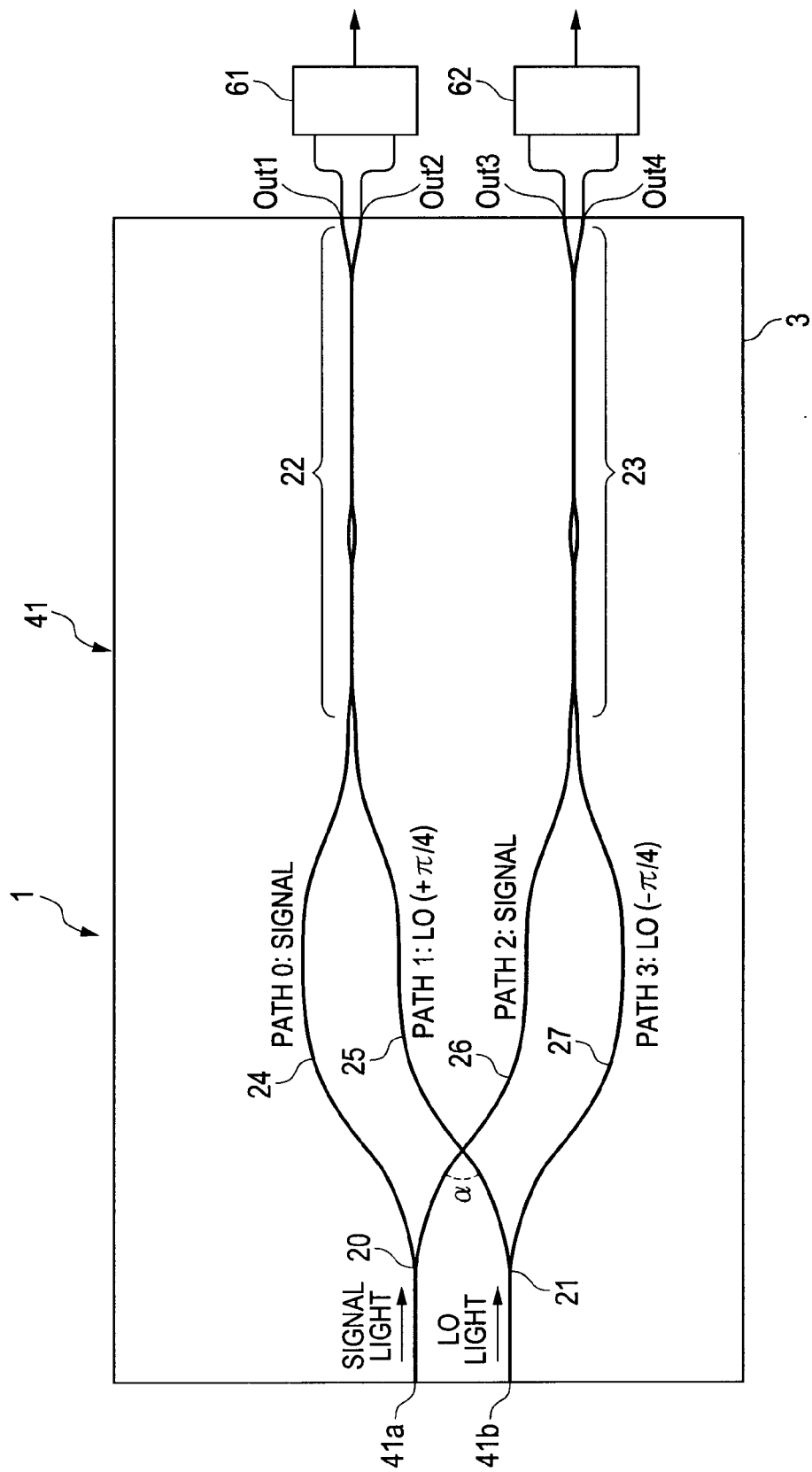
FIG. 1 is a schematic configuration diagram illustrating a PLC-type 90-degree hybrid according to a first embodiment of the present invention.

Hereinafter, embodiments of the present invention will be described based on the accompanying drawings. Note that, in the description of each embodiment, the same reference numeral is attached to the same member, and the repeated description thereof is omitted.

<PLC-Type 90-Degree Hybrid>

Each embodiment of a PLC-type 90-degree hybrid is described.

First Embodiment

Figure 2:
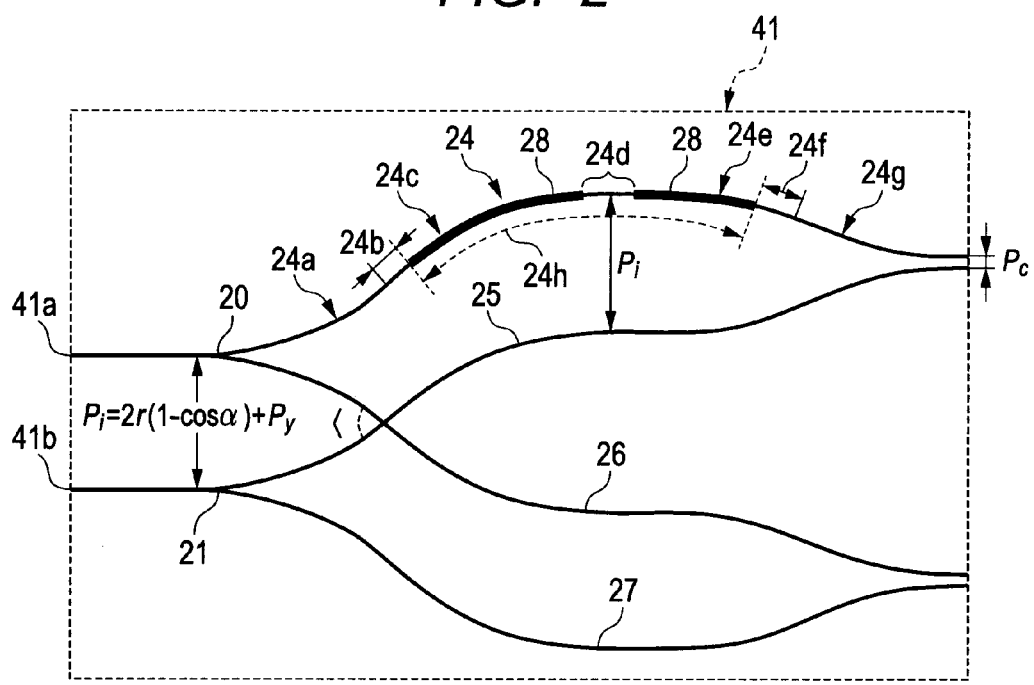
FIG. 2 is an explanatory view illustrating the detail of a 90-degree hybrid circuit in the first embodiment of the present invention.
Figure 3:
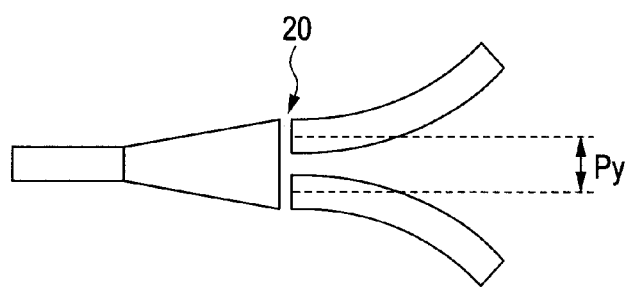
FIG. 3 is an explanatory view of a pitch between output waveguides in a Y-branch coupler used in the 90-degree hybrid circuit according to the first embodiment of the present invention.

A PLC-type 90-degree hybrid 1 according to a first embodiment is described based on FIG. 1 to FIG. 3. The PLC-type 90-degree hybrid 1 comprises: as illustrated in FIG. 1, a PLC chip 3 having a planar lightwave circuit formed therein; and a 90-degree hybrid circuit 41 which is formed in the planar lightwave circuit, and which mixes a modulated signal light and an local oscillation light to separate the signal light into quadrature components I and Q and output the same.

The 90-degree hybrid circuit 41 includes: two Y-branch couplers 20, 21 which are input side couplers; two wavelength-independent directional couplers (WINC) 22, 23 which are output side couplers; and arm waveguides 24 to 27 connected between the Y-branch couplers 20, 21 and the WINCs 22, 23. Note that, in the following description, the arm waveguides 24 to 27 may be referred to as a path 0 to a path 3, respectively.

As described above, the 90-degree hybrid circuit 41 includes: two Y-branch couplers 20, 21 branching a signal light and an local oscillation light (LO light), respectively; and two WINCs 22, 23 causing interference between the LO lights passing through two paths 1, 3, respectively, the two paths 1, 3 being branched by one Y-branch coupler 21 and set so that an optical path difference between the two paths 1, 3 becomes 90 degrees in terms of phase, and the signal lights passing through two paths 0, 2, respectively, the two paths 0, 2 being branched by the other Y-branch coupler 20.

A signal light, e.g., a quadrature-phase modulated X-polarization DP-QPSK signal, enters an input port 41$a$ of the 90-degree hybrid circuit 41, and an LO light having the same polarization and wavelength as the signal light enters an input port 41$b$, respectively (see FIG. 1). In the 90-degree hybrid circuit 41, the signal light is branched into two by the Y-branch coupler 20, and then the two branched signal lights enter one of the input ports of the WINCs 22, 23 through the paths 0, 2, respectively. Moreover, the LO light is branched into two by the Y-branch coupler 21, and then the two branched LO lights enter the other input port of the WINCs 22, 23 through the paths 1, 3, respectively. The optical path lengths of the paths 0, 2 are the same length L, and the optical path lengths of the paths 1, 3 are set so that the optical path difference between the paths 1, 3 becomes 90 degrees in terms of phase.

As described above, the 90-degree hybrid circuit 41 includes four paths connected between the Y-branch couplers 20, 21 and the WINCs 22, 23, respectively, wherein among four paths, the optical path lengths of the path 0 (the first path) and the path 2 (the third path), through which the signal light branched by the Y-branch coupler 20 passes, are set to the same length. Moreover, the path 1 (the second path) and the path 3 (the fourth path), through which the LO light branched by the Y-branch coupler 21 passes, are set so that the optical path difference therebetween becomes 90 degrees in terms of phase.

At least one path among four paths, e.g., the path 0, as illustrated in FIG. 2, includes a first bend waveguide 24$a$ with a rotation angle +$\theta_1$, a first straight waveguide 24$b$ with a length $l_1$, a second bend waveguide 24$c$ with a rotation angle −$\theta_1$, a second straight waveguide 24$d$ with a length h, a third bend waveguide 24$e$ with a rotation angle −$\theta_2$, a third straight waveguide 24$f$ with a length $l_2$, and a fourth straight waveguide 24$g$ with a rotation angle +$\theta_2$. The bend radius r of each of the bend waveguides 24$a$, 24$c$, 24$e$, and 24$g$ is set to the optimum value, e.g., 2000 μm. In FIG. 2, reference numeral 24$h$ represents a section in which a phase-trimming heater 28 is disposed.

Note that, in discussing the value of the rotation angle θ, the sign thereof is defined as positive when it rotates counter clockwise along the traveling direction of light, while when it rotates clockwise along the traveling direction of light, the sign is defined as negative. Moreover, the rotation angle θ refers to an angle (central angle) between two bend radii forming an arc of the bend radius r (curvature radius r) when the bend waveguide (curved waveguide) coincides with this arc. Accordingly, a fan-shaped arc with the bend radius r and the central angle (i.e., rotation angle) θ is the shape of the bend waveguide with the rotation angle θ.

In the 90-degree hybrid circuit 41, the optical path length of the path 0 can be adjusted to any optical path length by adjusting four parameters $\theta_1$, $\theta_2$, $l_1$, and $l_2$ under the condition that the bend radius r of each of the bend waveguides 24$a$, 24$c$, 24$e$, 24$g$ is fixed.

In the embodiment, in the arm waveguide 24, the sign of the rotation angle of the first bend waveguide 24$a$ is set positive, the sign of the rotation angle of the respective second bend waveguide 24$c$ and third bend waveguide 24$e$ is set negative, and the sign of the rotation angle of the fourth straight waveguide 24$g$ is set positive, so that the optical path becomes convex in the direction in which the optical path once moves away from the optical axis of the input waveguide via the input waveguide and Y-branch coupler 20 extending from the input port 41a. On the other hand, the arm waveguide 25, into which the LO light is introduced, is substantially parallel to the arm waveguide 24, with the sign of the rotation angle of each bend waveguide being set to the same as that of the arm waveguide 24 from the first bend waveguide 24a via the second bend waveguide 24c to the vicinity of the second straight waveguide 24d farthest from the input waveguide in the arm waveguide 24 arranged opposite thereto.

The arm waveguide 25 is then configured so as to have a shape substantially symmetrical with respect to the arm waveguide 24 by reversing the sign of the rotation angle of the bend waveguide with respect to the sign of the arm waveguide 24 in a portion opposite to a portion from the bend waveguide 24e to the bend waveguide 24g in the arm waveguide 24. Then, these two arm waveguides: the arm waveguide 24 and the arm waveguide 25, are brought close to each other with respect to the input ports of the WINC22 until the distance therebetween becomes a predetermined interval Pc, and these two arm waveguides are introduced into the input ports of the WINC22 substantially in parallel to each other.

Note that, as illustrated in FIG. 1 and FIG. 2, with regard to the arm waveguides 26 and 27, the signs of the rotation angles are reversed so that the arm waveguides 26 and 27 have substantially reversed shapes with respect to those of the arm waveguides 25 and 24, respectively. That is, in the arm waveguide 26 which is the second path (path 2) for the signal light to propagate, a portion corresponding to from the first bend waveguide 24a to the straight waveguide 24d is line-symmetric to the arm waveguide 24, which is the first path (path 0) for the signal light to propagate, with respect to an optical axis of the signal light (with respect to the direction going from the input port of the 90-degree hybrid circuit 41 toward the output port provided opposite to the input port), and a portion corresponding to from the third bend waveguide 24e to the fourth bend waveguide 24g has the same shape as the arm waveguide 24. Moreover, the arm waveguide 27, which is the second path (path 3) for the LO light to propagate, includes: a first portion having a shape line-symmetric to the arm waveguide 25, which is the first path (path 1) for the LO light to propagate, with respect to the optical axis; and a second portion having the same shape as the arm waveguide 25. However, at least one of the respective first portions of the waveguides 25 and 27 and the respective second portions of the waveguides 25 and 27, have the substantially same shape but have slightly different waveguide lengths set, and the waveguide lengths are adjusted so that a phase difference of 90 degrees is set between the LO light output from the arm waveguide 25 and the LO light output from the arm waveguide 27.

Thus, all the arm waveguides 24 to 27 take substantially the same structure with regard to the longitudinal direction or take a symmetrical structure in which only the bend direction is reversed, so that the waveguide paths through which each signal light and the LO light propagate can be made substantially the same, and as a result, very stable output characteristics can be obtained.

This point is now described in more detail. The propagation loss and the phase characteristic are determined by the optical path length and the bend angle of the waveguide, and an offset provided in the connection portion between the bend waveguide and the straight waveguide or between the bend waveguides. Accordingly, two waveguides each having a symmetrical shape may have substantially the same characteristic with regard to the propagation loss or the phase error.

Figure 9:
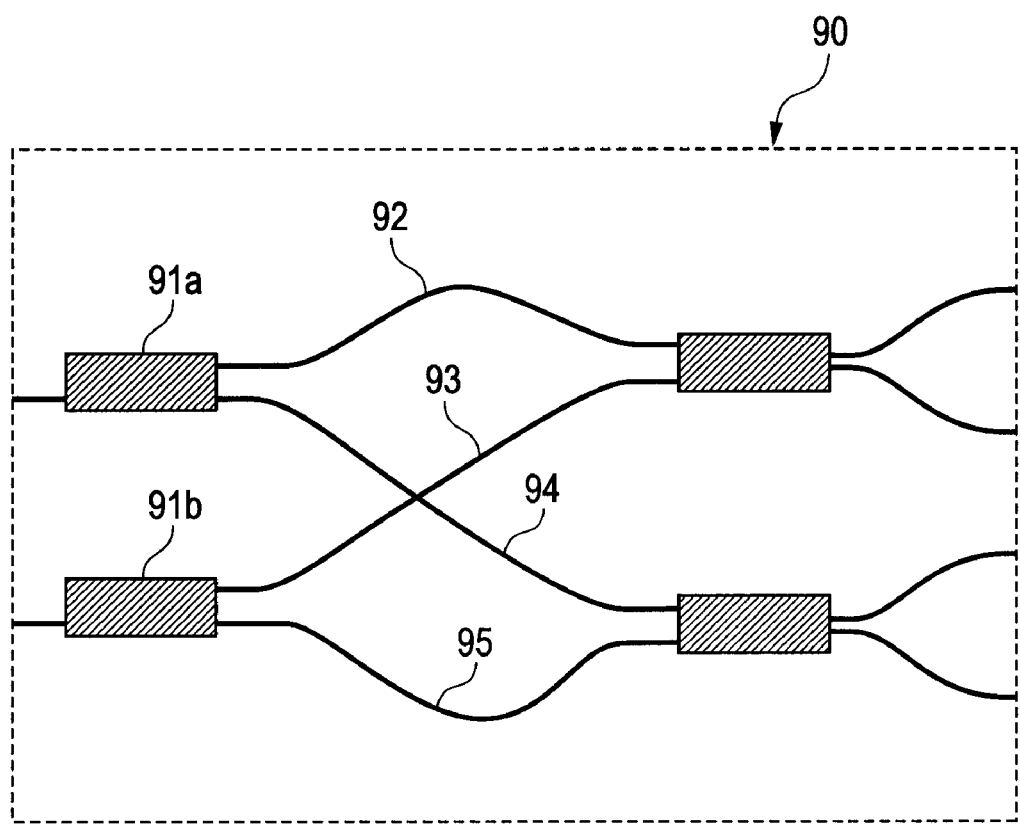
FIG. 9 is a schematic configuration diagram for illustrating the structure of a conventional 90-degree hybrid.

On the other hand, for example, as illustrated in FIG. 9, if the signal light is branched into two and the paths, through which the two branched signal lights propagate, have a asymmetrical shape in the 90-degree hybrid, then a difference tends to occur in the propagation loss or the phase characteristic. In FIG. 9, reference numeral 90 represents a conventional 90-degree hybrid, wherein the 90-degree hybrid 90 comprises: a coupler 91a branching the signal light into two; a coupler 91b branching the LO light into two; an arm waveguide 92 as the path 0; an arm waveguide 93 as the path 1; an arm waveguide 94 as the path 2; and an arm waveguide 95 as the path 3. Conventionally, as illustrated in FIG. 9, the arm waveguide 92 (path 0) and the arm waveguide 94 (path 2), which are the paths for the signal light to propagate, have an asymmetrical shape, and therefore the signal light propagating through the arm waveguide 92 undergoes a different situation (the bend and the like of the waveguide) from the signal light propagating through the arm waveguide 94. As a result, a difference occurs in the propagation loss or the phase characteristic as described above.

In particular, a difference occurring in the propagation loss or the phase characteristic in the signal light is not preferable because the stability of the 90-degree hybrid degrades. Accordingly, as the shape of the waveguide provided in the 90-degree hybrid, a structure disclosed in the embodiment is preferably employed from the view point of stability.

That is, the embodiment is characterized in that in order to unify the transmission loss or the phase characteristic, the signal light propagating through the path 0 and the signal light propagating through the path 2 are caused to undergo the same propagation situation (the bend and the like of the waveguide). In order to realize this characteristic configuration, in the embodiment of the present invention, the path 0 (the arm waveguide 24 in the embodiment) which is the first path for the signal to propagate includes at least one bend waveguide (the bend waveguides 24a, 24c, 24e, and 24g in the embodiment) and at least one straight waveguide (the straight waveguides 24b, 24d in the embodiment), wherein the arm waveguide 24 and the arm waveguide 26 are configured so as to have a substantially symmetrical shape for the signal light.

In the embodiment, the signal light is branched into two by the Y-branch coupler 20, and therefore taking into consideration that the signal light is branched into two while the propagation loss and the phase characteristic are unified, the connection areas where the arm waveguide 24 as the path 0 and the arm waveguide 26 as the path 2 are connected to the Y-branch coupler 20, preferably have at least a line-symmetric shape with each other with respect to the above-described optical axis. That is, a first waveguide portion (the bend waveguide 24a, the straight waveguide 24b, the bend waveguide 24c, and the straight waveguide 24d) of the arm waveguide 24 positioned in the latter stage of the signal propagation direction of the Y-branch coupler 20 and a first waveguide portion (the waveguide portion of the arm waveguide 26, facing the bend waveguide 24a, the straight waveguide 24b, the bend waveguide 24c, and the straight waveguide 24d) of the arm waveguide 26 have shapes line-symmetric to each other with respect to the above-described optical axis.

Furthermore, a second waveguide portion (the waveguide portion of the arm waveguide 26, facing the bend waveguide 24e, the straight waveguide 24f, and the bend waveguide 24g) of the arm waveguide 26 positioned in the latter stage of the first waveguide portion of the arm waveguide 26 has the same shape (the form in FIGS. 1, 2) as a second waveguide portion (the bend waveguide 24e, the straight waveguide 24f, the bend waveguide 24g) of the arm waveguide 24 positioned in the latter stage of the first waveguide portion of the arm waveguide 24, or has a shape line-symmetric to the second waveguide portion with respect to the above-described optical axis. Here, in the respective latter stages of the second waveguide portion of the arm waveguide 24 and the second waveguide portion of the arm waveguide 26, the WINCs 22, 23 are provided.

In this manner, in the embodiment, the arm waveguide 24 and the arm waveguide 26 have the same number of bend waveguides and the same number of straight waveguides. Furthermore, portions not having an identical shape between the arm waveguide 24 and the arm waveguide 26, which are the signal propagation paths, are made so as to have a line-symmetric shape with respect to a predetermined direction (the above-described optical axis). Therefore, with regard to the propagating signal light, there is no substantial difference between a change and the like in the traveling direction within the arm waveguide 24 and a change and the like in the traveling direction within the arm waveguide 26. Accordingly, in the embodiment, for the signal light, the shape of the arm waveguide 24 and the shape of the arm waveguide 26 may be substantially symmetrical with each other.

Moreover, among four paths, an intersection angle α (see FIG. 1, FIG. 2) at which the path 1 (the second path) and the path 2 (the third path) intersect with each other is set to a range from 60° to 90°. The intersection angle α is preferably equal to or greater than 60°. If the intersection angle α is smaller than 60°, the loss (crosstalk) at the intersection between the path 1 and the path 2 will occur. When the intersection angle α is set to 90°, the loss at the intersection is smallest.

Moreover, in the 90-degree hybrid circuit 41, a pitch Pi between the input ports 41a, 41b (an input port-to-input port pitch) is uniquely determined by the following formula using the intersection angle α, the bend radius r of the bend waveguide 24a, and the value of a pitch Py (see FIG. 3) between the output waveguides of the Y-branch couplers 20, 21.

$$Pi=2r(1-\cos \alpha)+Py$$

Note that, here, the bend waveguides of the arm waveguides 24 to 27 have the same bend radius r.

Moreover, in a section represented by reference numeral 24h (see FIG. 2) in either one of the path 1 and path 3 through which at least the LO light passes, e.g., the path 1, or in both the path 1 and the path 3, among four paths, the phase-trimming heater 28 is disposed. In a part within the section 24h in which the heater 28 is disposed, the second straight waveguide 24d with the length h is provided.

The place where the heater 28 is installed is not limited to this. The installation of the heater 28 in at least either one of the paths 1, 3, through which the LO light propagates, allows the phase trimming to be performed when the phases of the quadrature components I, Q of the signal light deviate. Moreover, the installation of the heater 28 in both the paths 1, 3, through which the LO light propagates, is further preferable because the trimming can be performed both when a positive phase error occurred and when a negative phase error occurred. Furthermore, the heater may be provided in all the arm waveguides 24 to 27. In this case, due to the provision of the heater in the arm waveguide 25 as well as the arm waveguide 27, through which the LO light propagates, an effect can be attained that the above-described symmetry between the arm waveguides 24 and 26, through which the signal light propagates, is prevented from being impaired. As a result, all the optical characteristics of the arm waveguides 24 to 27 can be made uniform, and the 90-degree hybrid circuit having a very stable output characteristic can be obtained.

According to the first embodiment having the above-described configuration, the following operational effects can be attained.

(1) Usually, the 90-degree hybrid is required to have a low loss and a small size while being required to have a wide band operation (e.g., CL Band; 1530 to 1620 nm). As the optical coupler provided in the 90-degree hybrid, a directional coupler (DC) or a multimode interferometer (MMI) may be used. However, in the DC, the coupling efficiency has a wavelength dependency, and there is also a variation in the characteristic due to manufacturing errors. Moreover, in the MMI, the value of an excess loss has a wavelength dependency. In contrast, in the Y-branch coupler, the branch ratio does not have a wavelength dependency and has a small manufacturing error, and additionally, the size as the coupler is small. Therefore, the Y-branch coupler is most preferable as the input side coupler of the 90-degree hybrid circuit 41. On the other hand, since the WINC has a constant branch ratio with respect to the wavelength and has a small manufacturing variation, the WINC is most preferable as the output side coupler of the 90-degree hybrid circuit 41.

In the 90-degree hybrid circuit 41 of the embodiment, the Y-branch couplers 20, 21 are used as the input side couplers branching the signal light and the LO light, respectively, while as the output side coupler causing interference between the LO light and the signal light, the WINCs 22, 23 are used. Therefore, a PLC-type 90-degree hybrid capable of miniaturization and wavelength independence and also capable of a stable operation in a wide band can be realized.

(2) The optical path length of at least one path (e.g., the path 0) of four paths can be adjusted to any optical path length by adjusting four parameters $\theta_1$, $\theta_2$, $l_1$, and $l_2$ under the condition that the bend radius r of the respective bend waveguides 24a, 24c, 24e, and 24g is fixed. That is, by adjusting four parameters, the optical path length of the path 0 can be freely changed and the degree of freedom in design can be expanded. In particular, under the condition that the bend radius of the respective bend waveguides 24a, 24c, 24e, and 24g is fixed to the optimum value, the optical path length of the path 0 can be freely changed by adjusting four parameters. Therefore, the design of 90-degree hybrid corresponding to various kinds of specifications can be facilitated.

(3) The loss at the intersection between the path 1 and the path 2 can be suppressed by setting the intersection angle α (see FIG. 1, FIG. 2), at which the path 1 and the path 2 intersect, to a range from 60° to 90°.

(4) The phase-trimming heater 28 is disposed in at least either one of the path 1 and path 3 (e.g., the path 1 or both the path 1 and the path 2), through which the LO light passes, among four paths, so that the phase trimming when the phases of the quadrature components I, Q deviate can be made by driving the heater 28.

(5) The second straight waveguide 24d with the length h is provided in at least one path among four paths, e.g., in a part of the section 24h, in which the heater 28 is disposed, in the path 0. Thus, a shortage against a given length of the heater 28 can be compensated by the second straight waveguide 24d.

Note that, in place of the WINCs 22, 23, an optical coupler, such as the directional coupler (DC) or the multimode interferometer (MMI), may be used in the 90-degree hybrid depending on the tolerance of the wavelength dependency of the coupling efficiency or the excess loss.

Second Embodiment

Figure 4:
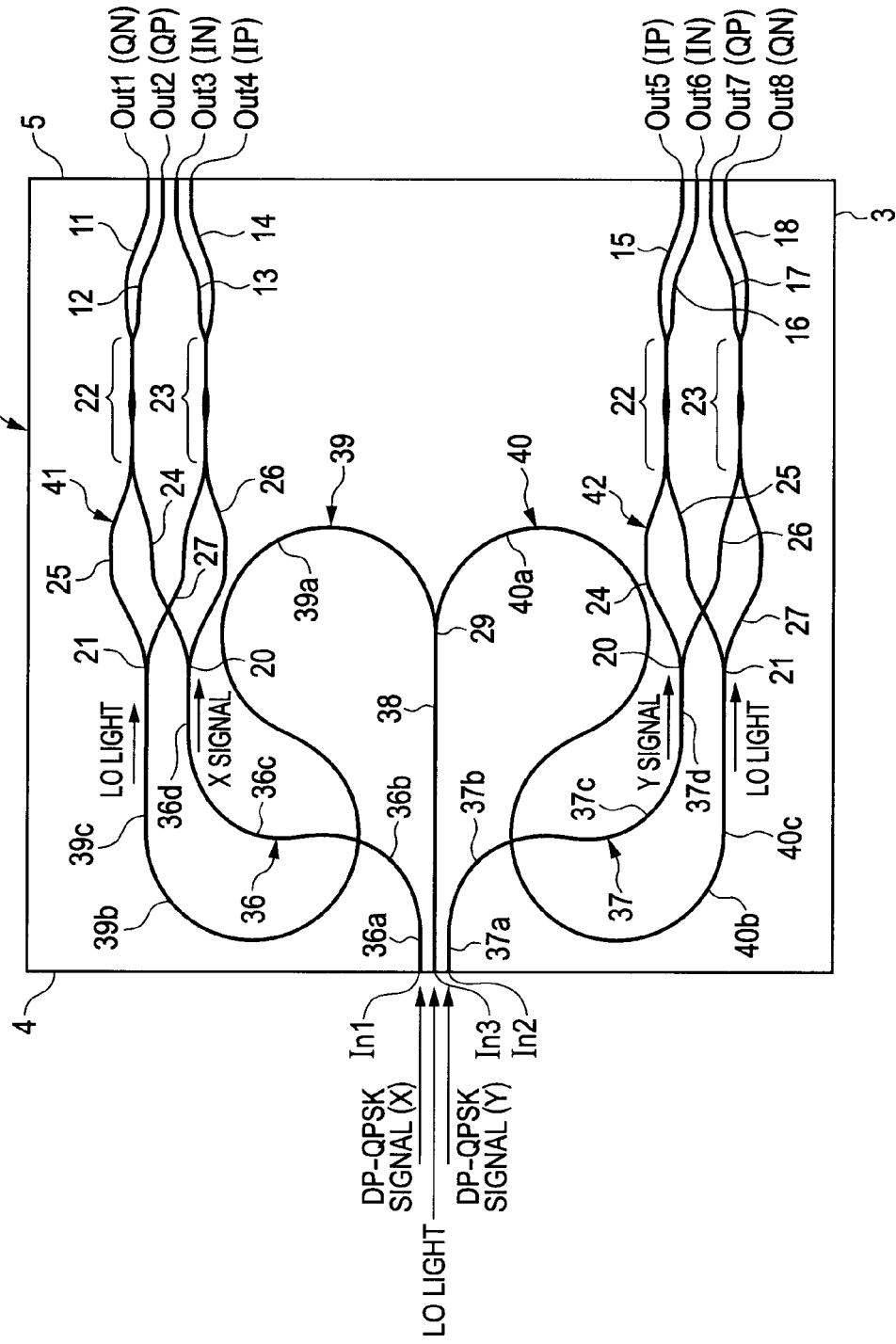
FIG. 4 is a schematic configuration diagram illustrating a PLC-type 90-degree hybrid according to a second embodiment of the present invention.

Next, a PLC-type 90-degree hybrid 1A according to a second embodiment is described based on FIG. 4.

In the PLC-type 90-degree hybrid 1A, as illustrated in FIG. 4, two 90-degree hybrid circuits 41, 42 with the same configuration are provided as the 90-degree hybrid circuit. The 90-degree hybrid circuit 41 is formed on the right upper side of a PLC chip 3 of rectangular shape close to substantially square, and the 90-degree hybrid circuit 42 is formed on the right lower side of the PLC chip 3, respectively.

There are three input ports In1, In2, and In3 on an input end 4. An X-polarization QPSK signal (DP-QPSK signal (X): X signal) incident upon the input port In1 enters the Y-branch coupler 20 of the 90-degree hybrid circuit 41 via an X-signal waveguide 36. Moreover, a Y-polarization QPSK signal (DP-QPSK signal (Y): Y signal) incident upon the input port In2 enters the Y-branch coupler 20 of the 90-degree hybrid circuit 42 via a Y-signal waveguide 37.

Moreover, an LO light having both X and Y polarization components (e.g., a linearly-polarized wave whose angle with respect to the X-axis is 45 degrees) enters the input port In3 in the center of the input end 4. This LO light passes through an input waveguide 38 and is branched into two by a Y-branch coupler 29, and then the two branched lights pass through LO-light waveguides (local-oscillation light waveguides) 39, 40 and enter the Y-branch coupler 21 of the 90-degree hybrid circuits 41, 42, respectively.

As described above, in the 90-degree hybrid circuit 41, among two Y-branch couplers 20, 21, the LO light enters the Y-branch coupler 21 on the upper side (on the upper side in FIG. 4) and the X signal enters the Y-branch coupler 20 on the lower side, respectively. The 90-degree hybrid circuit 42 has the same configuration as the 90-degree hybrid circuit 41 described in FIG. 1. In the 90-degree hybrid circuit 42, among the two Y-branch couplers 20, 21, the X signal enters the Y-branch coupler 20 on the upper side (on the upper side in FIG. 4) and the LO light enters the Y-branch coupler 20 on the lower side, respectively.

In the PLC-type 90-degree hybrid 1A, the input ports In1, In2, and In3 are located in the center of the input end 4, and the 90-degree hybrid circuits 41, 42 are arranged on the right upper side and right lower side of the PLC chip 3, respectively. Here, in order to reduce the size of the rectangular PLC chip 3, the following configurations are employed in the X-signal waveguide 36, the Y-signal waveguide 37, and the LO-light waveguides 39, 40.

The X-signal waveguide 36 includes a straight waveguide 36a connected to the input port In1 in the center of the input end 4, a bend waveguide 36b whose rotation angle θ is approximately +90 degrees, a bend waveguide 36c whose rotation angle θ is approximately −90 degrees, and a straight waveguide 36d connected to the Y-branch coupler 20 of the 90-degree hybrid circuit 41.

The Y-signal waveguide 37 includes a straight waveguide 37a connected to the input port In2 in the center of the input end 4, a bend waveguide 37b whose rotation angle θ is approximately −90 degrees, a bend waveguide 37c whose rotation angle θ is approximately +90 degrees, and a straight waveguide 37d connected to the Y-branch coupler 20 of the 90-degree hybrid circuit 42.

The LO-light waveguide 39 extends from one of the output waveguides of the Y-branch coupler 29, and includes: a folded waveguide 39a which is a bend waveguide with a positive rotation angle (+θ), the bend waveguide continuing for approximately 260 degrees; a folded waveguide 39b which is a bend waveguide with a negative rotation angle (−θ), the bend waveguide continuing for approximately 260 degrees; and a straight waveguide 39c connected to the Y-branch coupler 21 of the 90-degree hybrid circuit 41.

The LO-light waveguide 40 extends from the other one of the output waveguides of the Y-branch coupler 29, and includes: a folded waveguide 40a which is a bend waveguide with a negative rotation angle (−θ), the bend waveguide continuing for approximately 260 degrees; a folded waveguide 40b which is a bend waveguide with a positive rotation angle (+θ), the bend waveguide continuing for approximately 260 degrees; and a straight waveguide 40c connected to the Y-branch coupler 21 of the 90-degree hybrid circuit 41.

Moreover, in the PLC-type 90-degree hybrid 1A, the WINCs 22, 23 are used as the output side couplers of the 90-degree hybrid circuits 41, 42, respectively.

Two ports of the WINC22 of the 90-degree hybrid circuit 41 are connected to the output ports Out1, 2 via output waveguides 11, 12, and two ports of the WINC23 are connected to the output ports Out3, 4 via output waveguides 13, 14, respectively. Moreover, two ports of the WINC22 of the 90-degree hybrid circuit 42 are connected to output ports Out5, 6 via output waveguides 15, 16, and two ports of the WINC23 are connected to output ports Out7, 8 via output waveguides 17, 18, respectively.

In the PLC-type 90-degree hybrid 1A having such a configuration, the 90-degree hybrid circuit 41 mixes the X signal and the LO light to separate the X signal into the quadrature components I, Q and output the same. On the other hand, the 90-degree hybrid circuit 42 mixes the Y signal and the LO light to separate the Y signal into the quadrature components I, Q and output the same.

Thus, from the output ports Out1, 2, the signal light of the Q channel component (the imaginary part on the complex plane: sine component) among the quadrature components I, Q, which are made by converting the X signal into the intensity modulation signals, is output, respectively. From the output ports Out3, 4, the signal light of the I channel component (the real part on the complex plane: cosine component) is output, respectively. For example, from the output ports Out1, 2, signal lights QN, QP (two signal lights with opposite phases) of the Q channel component are output, respectively, while from the output ports Out3, 4, the signal lights IN, IP (two signal lights with opposite phases) of the I channel component are output, respectively. In this case, the arrangement order of the output light types obtained from the output ports Out1 to OUT4 is QN, QP, IN, and IP.

On the other hand, from the output ports Out5, 6, the signal light of the I channel component among the quadrature components I, Q, which are made by converting the Y signal into the intensity modulation signals, is output. From the output ports Out7, 8, the signal light of the Q channel component is output, respectively. For example, from the output ports Out5, 6, the signal lights IP, IN of the I channel component are output, respectively, while from the output ports Out7, 8, the signal lights QP, QN of the Q channel component are output, respectively. In this case, the arrangement order of the output light types obtained from the output ports Out5 to OUT8 is IP, IN, QP, and QN.

Moreover, in the PLC-type 90-degree hybrid 1A, a plurality of input ports (e.g., three input ports In1, In2, and In3 in the embodiment) is intensively arranged in the center of the input end 4. Moreover, four output ports Out1-Out4 of the 90-degree hybrid circuit 41 are intensively arranged on the upper side of the output end 5, respectively, and four output ports Out5-Out8 of the 90-degree hybrid circuit 42 are intensively arranged on the lower side of the output end 5, respectively.

According to the second embodiment having the above-described configuration, the following operational effects can be attained in addition to the operational effects attained by the first embodiment.

(1) The 90-degree hybrid circuit according to the embodiment can be used in a receiver of a coherent optical transmission system that mixes a signal light and an LO light, e.g., the DP-QPSK receiver receiving a DP-QPSK signal.

(2) An LO light having both the X and Y polarization components enters the input waveguide 38 from the input port in the center of the input end 4. As the light source (LO light source) of the local oscillation light, only one LO light source having a single linear polarization component is used. In connecting the LO light source to the PLC using a polarization holding fiber, the LO light source may be connected so that the polarization of the LO light forms an angle of 45 degrees with the X-polarized wave (with the axis in a plane perpendicular to the guide direction of light, the axis being in parallel to the PLC plane) of the propagation light within the waveguide. Alternatively, as another method, before the Y-polarization DP-QPSK signal enters the PLC, a half-wavelength plate may be used and the polarization plane thereof is rotated by 90 degrees, so that the Y-polarization DP-QPSK signal enters the PLC physically in the X-polarized state. In this case, the LO having only the X-polarization component may be caused to enter the input waveguide 38 from the input port in the center of the input end 4, and in connecting the LO light source to the PLC using the polarization holding fiber, the LO light source may be connected so that the polarized wave of the LO light aligns with the X-polarized wave of the propagation light within the waveguide.

(3) After the LO light is branched into two by the Y-branch coupler 29, the two branched LO lights pass through the LO-light waveguides 39, 40 and enter the Y-branch coupler 21 of the 90-degree hybrid circuits 41, 42, respectively, which are arranged on the right upper side and on the right lower side of the PLC chip 3, respectively. Since each of the LO-light waveguides 39, 40 has the above-described configuration, two 90-degree hybrid circuits 41, 42 can be arranged adjacent to each other in the vertical direction of the PLC chip 3 while securing such a small radius (bend radius) that prevents light from leaking, in each bend waveguide. Accordingly, a small PLC-type 90-degree hybrid can be realized without degrading the optical characteristics.

(4) All the circuits can be arranged in a narrow area of the PLC chip 3 of rectangular shape close to substantially square, and a small PLC-type 90-degree hybrid can be realized.

Third Embodiment

Figure 5:
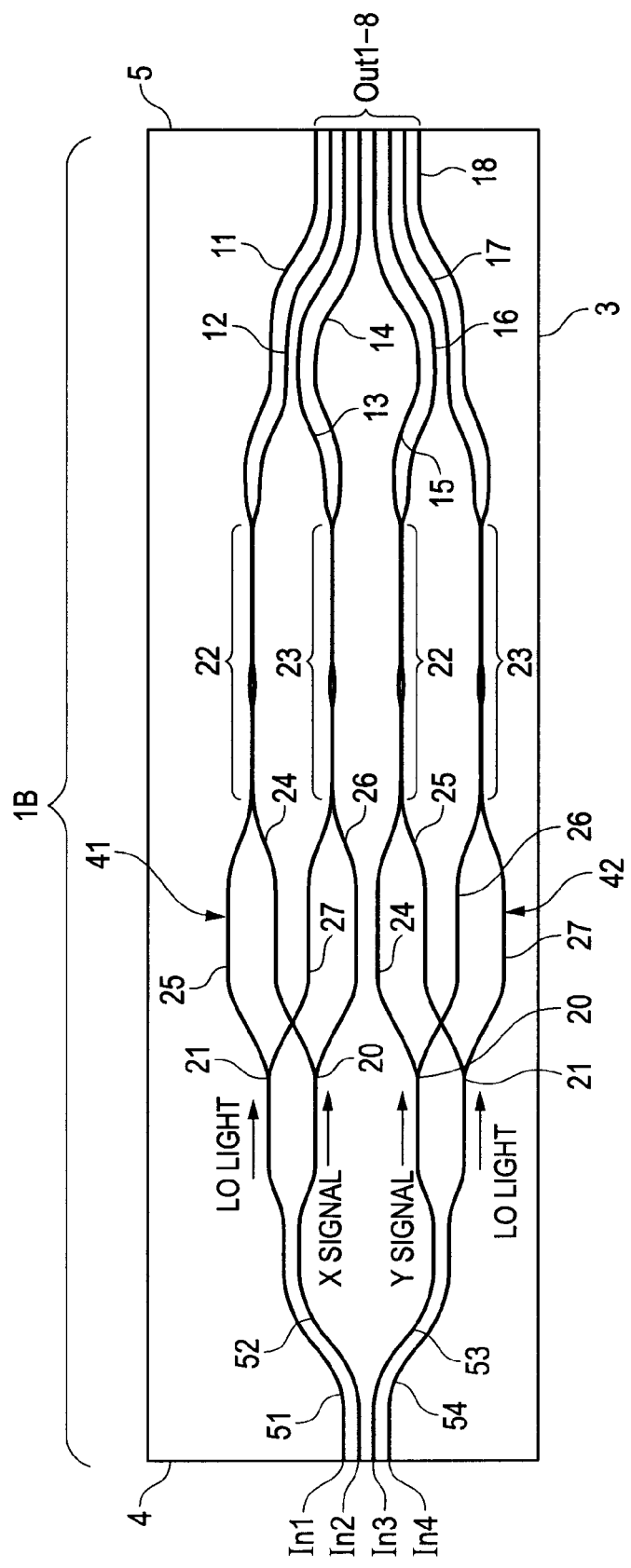
FIG. 5 is a schematic configuration diagram illustrating a PLC-type 90-degree hybrid according to a third embodiment of the present invention.

Next, a PLC-type 90-degree hybrid 1B according to a third embodiment is described based on FIG. 5.

In the PLC-type 90-degree hybrid 1B, as illustrated in FIG. 5, a plurality of input ports (four input ports In1 to In4, in the embodiment) is intensively arranged in the center of the input end 4.

Moreover, four output ports Out1 to Out4 of the 90-degree hybrid circuit 41 and four output ports Out5 to Out8 of the 90-degree hybrid circuit 42 are intensively arranged in the center of the output end 5.

The input ports In1, In2 are connected to the Y-branch couplers 21, 20 of the 90-degree hybrid circuit 41 via input waveguides 51, 52, respectively. Moreover, the input ports In3, 4 are connected to the Y-branch couplers 20, 21 of the 90-degree hybrid circuit 42 via input waveguide 53, 54, respectively. An LO light having the same wavelength and polarization as the X polarization DP-QPSK signal enters the input port In1, and the X polarization DP-QPSK signal (X signal) enters the input port In2, respectively. On the other hand, the Y-polarization DP-QPSK signal (Y signal) enters the input port In3, and an LO light having the same wavelength and polarization as the Y-polarization DP-QPSK signal enters the input port In4, respectively.

According to the third embodiment having the above-described configuration, the following operational effects can be attained in addition to the operational effects attained by the first embodiment.

The size in the vertical direction (the vertical direction in the plane of FIG. 5) of the rectangle PLC chip 3 can be reduced.

Since the output ports Out1 to Out8 are intensively arranged on the output end 5, the optical connection between output waveguides 11 to 18 and an optical fiber array or a balanced photo diode (B-PD) array can be facilitated.

Fourth Embodiment

Figure 6:
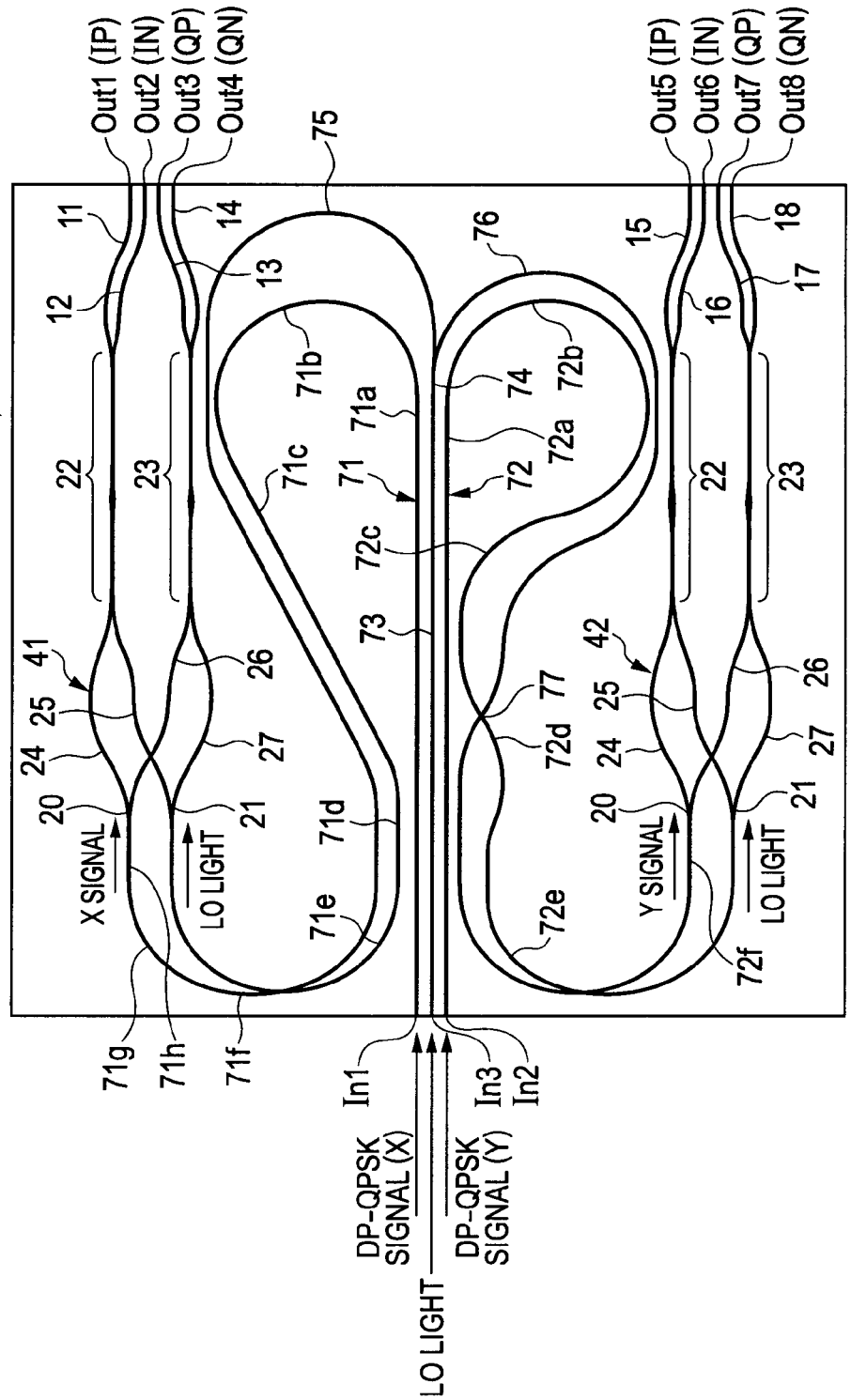
FIG. 6 is a schematic configuration diagram illustrating a PLC-type 90-degree hybrid according to a fourth embodiment of the present invention.

Next, a PLC-type 90-degree hybrid 1C according to a fourth embodiment is described based on FIG. 6.

In the PLC-type 90-degree hybrid 1C, as shown in FIG. 6, in a 90-degree hybrid circuit 42 for the Y signal, a Y-signal waveguide (signaling waveguide) 72 and an LO-light waveguide (local-oscillation light waveguide) 76 are caused to intersect with each other at an intersection 77. As a result, in two Y-branch couplers 20, 21 of the 90-degree hybrid circuit (the second 90-degree hybrid circuit) 42, as with the 90-degree hybrid circuit 41 for the X signal (the first 90-degree hybrid circuit), the signal (Y signal) enters the upper Y-branch coupler 20 and the LO light enters the lower Y-branch coupler 21, respectively. That is, the Y-branch coupler 20 and the Y-branch coupler 21 of the first 90-degree hybrid circuit 41 and second 90-degree hybrid circuit 42 are arranged in the same order along a predetermined direction (in FIG. 6, the direction from above to below the view).

Thus, the PLC-type 90-degree hybrid 1C has the following configuration in order to cause the signals (X signal, Y signal) to enter the upper Y-branch coupler 20 and cause the LO light to enter the lower Y-branch coupler 21, respectively, in two 90-degree hybrid circuits 41, 42.

Here, the configuration different from that of the PLC-type 90-degree hybrid 1A illustrated in FIG. 4 is mainly described. The X-polarization QPSK signal (X signal) incident upon the input port In1 enters the upper Y-branch coupler 20 among two Y-branch couplers of the 90-degree hybrid circuit 41 via the X-signal waveguide 71. Moreover, the Y-polarization QPSK signal (Y signal) incident upon the input port In2 enters the upper Y-branch coupler 20 among two Y-branch couplers of the 90-degree hybrid circuit 42 via the Y-signal waveguide 72.

After the LO light incident upon the input port In3 passes through the input waveguide 73 and is branched into two by the Y-branch coupler 74, the two branched LO lights pass through the LO-light waveguides 75, 76 and enter the lower Y-branch coupler 21, respectively, among two Y-branch couplers of the 90-degree hybrid circuits 41, 42.

The X-signal waveguide (input waveguide) 71 includes: a straight waveguide 71a extending straight from the input port In1 by approximately two-thirds the horizontal width of the PLC chip 3; a bend waveguide 71b whose rotation angle θ is +180; an inclined waveguide 71c extending straight diagonally downward left; a straight waveguide 71d extending horizontally; a bend waveguide 71e whose rotation angle θ is +90; a straight waveguide 71f extending straight upward; a bend waveguide 71g whose rotation angle θ is +90; and a straight waveguide 71h connected to the Y-branch coupler 20 of the 90-degree hybrid circuit 41.

The LO-light waveguide 75 extends from one of the output waveguides of the Y-branch coupler 74 to the Y-branch coupler 21 along the X-signal waveguide 71 without intersecting with the X-signal waveguide 71.

The Y-signal waveguide (input waveguide) 72 includes: a straight waveguide 72a extending straight from the input port In2 by approximately two-thirds the horizontal width of the PLC chip 3; a bend waveguide 72b whose rotation angle θ is approximately −270 degrees; a bend waveguide 72c whose rotation angle θ is approximately +90 degrees; a bend waveguide 72d extending diagonally downward left; a bend waveguide 72e whose rotation angle θ is +180; and a straight waveguide 72f connected to the Y-branch coupler 20 of the 90-degree hybrid circuit 42.

The LO-light waveguide 76 intersects with the Y-signal waveguide 72 at an intersection 77, from the other one of the output waveguides of the Y-branch coupler 74 halfway to the Y-branch coupler 21 of the 90-degree hybrid circuit 42.

Moreover, in the PLC-type 90-degree hybrid 1C, in order to cancel out a time delay between the X signal light and the Y signal light, the design is made so that the waveguide length of each signal of the X signal and the Y signal and the waveguide length of each LO light become identical, respectively.

Specifically, the X-signal waveguide 71 takes a path which shortens the optical path length, and the LO-light waveguide 75 lengthens the optical path length by employing a redundant configuration.

According to the fourth embodiment with the above-described configuration, the following operational effects can be attained in addition to the operational effects attained by the second embodiment.

The arrangement order of the output light types obtained from the output waveguides 11 to 14 of the 90-degree hybrid circuit 41 for the X signal can be advantageously the same as the arrangement order of the output light types obtained from the output waveguides 15 to 18 of the 90-degree hybrid circuit 42.

Specifically, from the output ports Out1, 2 connected to the WINC22 of the 90-degree hybrid circuit 41, the signal lights IP, IN of the I channel component are output. Moreover, from the output ports Out3, 4 connected to the WINC23 of the 90-degree hybrid circuit 41, the signal lights QP, QN of the Q channel component are output.

On the other hand, from the output ports Out 5.6 connected to the WINC22 of the 90-degree hybrid circuit 42, the signal lights IP, IN of the I channel component are output. Moreover, from the output ports Out7, 8 connected to the WINC23 of the 90-degree hybrid circuit 42, the signal lights QP, QN of the Q channel component are output.

Thus, the arrangement order of the output light types obtained from the output waveguides 11 to 14 of the 90-degree hybrid circuit 41 and the arrangement order of the output light types obtained from the output waveguides 15 to 18 of the 90-degree hybrid circuit 42 are IP, IN, QP, and QN, respectively. In contrast, in the second embodiment illustrated in FIG. 4, the arrangement order of the output light types obtained from the output waveguides 15 to 18 of the 90-degree hybrid circuit 42 is vertically reversed with respect to the arrangement order of the output light types obtained from the output waveguides 15 to 18 of the 90-degree hybrid circuit 41, or the signs of the output light types of the former are reversed with respect to those of the latter.

Application Example

Figure 7:
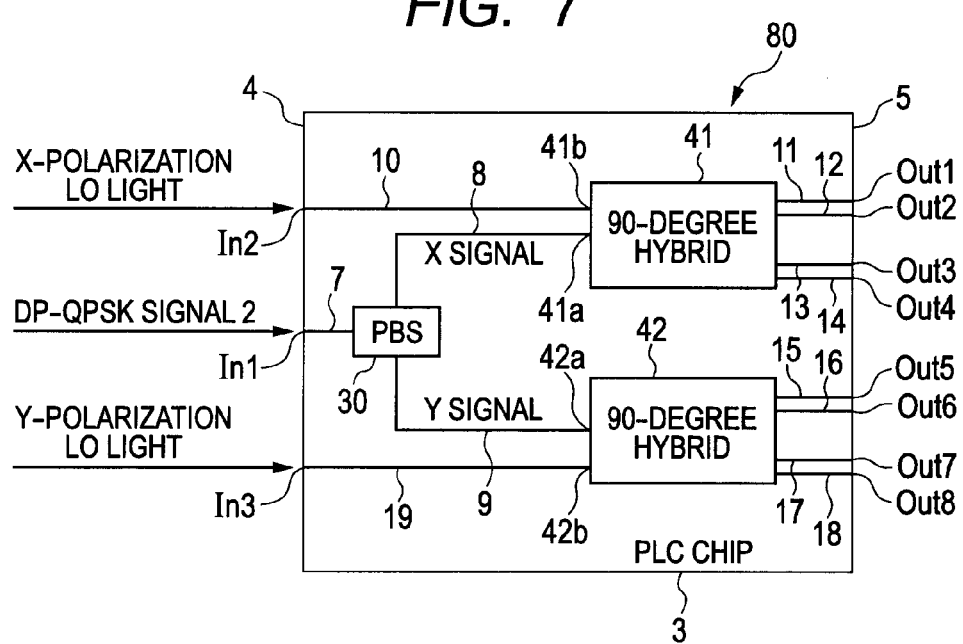
FIG. 7 is a block diagram illustrating an application example using a PLC-type 90-degree hybrid according to one embodiment of the present invention.

FIG. 7 illustrates a PLC-type DP-QPSK receiver 80 as an application example using the above-described 90-degree hybrid circuits 41, 42.

The PLC-type DP-QPSK receiver (hereinafter, referred to as the receiver) 80 comprises one PLC chip 3 having a planar lightwave circuit formed therein. In the PLC chip 3, on a substrate (not shown), such as a quartz substrate or a silicon substrate, a planar lightwave circuit (PLC) including a plurality of waveguides each including a core and a cladding is formed using a combination of an optical-fiber manufacturing technique and a semiconductor microfabrication technique. This PLC is a quartz planar lightwave circuit, for example.

The input port In1 for a DP-QPSK signal 2 and the input ports In2, In3 for local oscillation lights are provided on the input end 4 of the PLC chip 3. A local oscillation light (X-polarization LO light) having the same polarization and wavelength as the X-polarization QPSK signal enters the input port In2. A local oscillation light (Y-polarization LO light) having the same polarization and wavelength as the Y-polarization QPSK signal enters the input port In3.

The output ports Out1 to Out8 of the signal light are provided on an output end 5 of the PLC chip 3, respectively. From the output ports Out1, 2, the signal light of the I channel component among the quadrature components I, Q of the X-polarization QPSK signal is demodulated and output, respectively, while from the output ports Out3, 4, the signal light of the Q channel component among the quadrature components I, Q of the X-polarization QPSK signal is demodulated and output, respectively.

Moreover, from the output ports Out5, 6, the signal light of the I channel component of the Y-polarization QPSK signal is demodulated and output, respectively, while from the output ports Out7, 8, the signal light of the Q channel component of the Y-polarization QPSK signal is demodulated and output, respectively.

Inside the PLC of the PLC chip 3, a polarization beam splitter (PBS) 30 polarizing and separating the DP-QPSK signal 2 into the X-polarization QPSK signal (X signal) and the Y-polarization QPSK signal (Y signal) and two 90-degree hybrid circuits 41, 42 for X polarization and for Y polarization are integrated. The 90-degree hybrid circuits 41, 42 have the same configuration as the 90-degree hybrid circuits 41, 42 described in FIG. 1 and FIG. 4.

Figure 8:
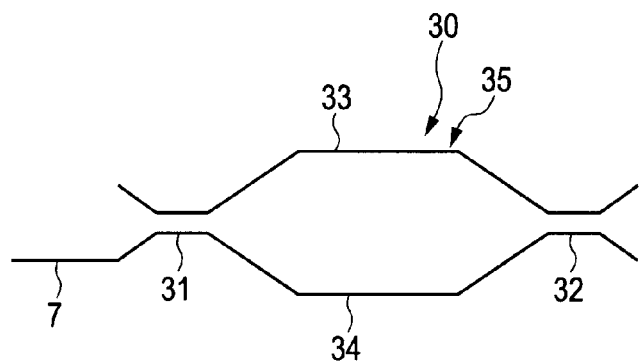
FIG. 8 is a schematic configuration diagram illustrating a PBS used in a receiver of FIG. 7.

The PBS30 includes: two couplers 31, 32; and a Mach Zehnder interferometer (MZI) 35 including two arm waveguides 33, 34 connected between both couplers 31, 32, as illustrated in FIG. 8. The input side coupler 31 and the output side coupler 32 are 3 dB-couplers each including a directional couplers (DC). The input waveguide 7 is connected to one of two input ports of the input side coupler 31 (see FIG. 7).

In the receiver 80 having the above-described configuration, first, the DP-QPSK signal 2 input from the input port In1 enters the PBS30 through the input waveguide 7, and is polarized and separated by the PBS30 into the X-polarization QPSK signal (X signal) and the Y-polarization QPSK signal (Y signal). The X signal enters the 90-degree hybrid circuit 41 through the waveguide 8, and the Y signal enters the 90-degree hybrid circuit 42 through the waveguide 9, respectively.

In the 90-degree hybrid circuit 41, the X signal and the X-polarization LO light entering through the waveguide 10 from the input port In2 are mixed. That is, the X signal passing through the path 0 and the LO light passing through the path 1 are mixed by the output side coupler 22, while the X signal passing through the path 2 and the LO light passing through the path 3 are mixed by the output side coupler 23.

Thus, the signal light of the I channel component and the signal light of the Q channel component, which are made by converting the X signal (i.e., the X-polarization QPSK signal), into the intensity modulation signals, can be extracted independently. The signal light of the I channel component in the X polarized wave is output from the output ports Out1, 2 through the output waveguides 11, 12. On the other hand, the signal light of the Q channel component is output from the output ports Out3, 4 through the output waveguides 13, 14, respectively. However, the outputs of the I, Q channels can be replaced with each other by changing the configuration of the 90-degree hybrid 41. Specifically, the optical path length conditions of the path 1 and the path 3 may be replaced with each other. Note that, the signal lights of the I channel component and Q channel component in the X polarized wave are input to balanced photo diodes (B-PD) 61 and 62, respectively, for example with or without via an optical fiber as illustrated in FIG. 1.

On the other hand, in the 90-degree hybrid circuit 42, the Y-polarization LO light entering through the waveguide 19 from the input port In3 and the Y signal which is the Y-polarization QPSK signal are mixed. Thus, the signal light of the I channel component and the signal light of the Q channel component, which are made by converting the Y signal into the intensity modulation signals, are extracted independently. The signal light of the I channel component in the Y polarized wave is output from the output ports Out5, 6 through the output waveguides 15, 16. On the other hand, the signal light of the Q channel component is output from the output ports Out7, 8 through the output waveguides 17, 18, respectively. However, as with the case of the 90-degree hybrid 41, the outputs of the I, Q channels can be replaced with each other. The signal lights of the I channel component and Q channel component in the Y polarized wave are input to a B-PD (not shown), respectively, with or without via an optical fiber.

Note that the present invention may be modified and embodied as follows.

In the PLC-type 90-degree hybrids 1, 1A, and 1B described in the above-described respective embodiments, a set of receiving circuits including at least one 90-degree hybrid circuit and a waveguide connected to the 90-degree hybrid circuit is formed above the PLC chip 3. However, the present invention can be applicable to a PLC-type 90-degree hybrid in which a plurality of sets of receiving circuits is formed on the PLC chip 3. In the PLC-type 90-degree hybrid configured in this manner, one optimum receiving circuit among a plurality of sets of receiving circuits can be selected, so that the yield can be improved and a further reduction in cost can be achieved.

Note that, in the foregoing, the PLC-type 90-degree hybrids of the present invention have been described assuming that the PLC-type 90-degree hybrids are used in the demodulation of a DP-QPSK signal. However, the application of the present invention is not limited to the DP-QPSK modulation system, and the present invention can be applicable to an ordinary coherent modulation system, wherein on the receiving side, demodulation is performed by mixing a signal light with a local oscillation light, for example, to the modulation systems, such as QAM (quadrature amplitude modulation) and OFDM (orthogonal frequency division multiplex).

The invention claimed is:

1. A 90-degree hybrid, comprising:
    a planar lightwave circuit (PLC) chip having a planar lightwave circuit; and
    a 90-degree hybrid circuit formed within the planar lightwave circuit and mixing a modulated signal light and a local oscillation light to output,
    the 90-degree hybrid circuit including:
        a first Y-branch coupler branching the signal light;
        a second Y-branch coupler branching the local oscillation light;
        a first coupler causing interference between one of two signal lights branched by the first Y-branch coupler and one of two local oscillation lights branched by the second Y-branch coupler;
        a second coupler causing interference between the other one of two signal lights branched by the first Y-branch coupler and the other one of two local oscillation lights branched by the second Y-branch coupler;
        a first path for connecting the first Y-branch coupler and the first coupler and for causing one of the two branched signal lights to propagate therethrough, the first path having at least one bend waveguide and at least one straight waveguide;
        a second path for connecting the first Y-branch coupler and the second coupler and for causing the other one of the two branched signal lights to propagate therethrough, the second path having the same number of bend waveguides as the first path and the same number of straight waveguides as the first path;
        a third path for connecting the second Y-branch coupler and the first coupler and for causing one of the two branched local oscillation lights to propagate therethrough; and
        a fourth path for connecting the second Y-branch coupler and the second coupler and for causing the other one of the two branched local oscillation lights to propagate therethrough, wherein
    the first path and the second path are configured so as to have the same optical path length,
    the third path and the fourth path are configured so that an optical path difference between one of the two branched local oscillation lights and the other one of the two branched local oscillation lights becomes 90 degrees in terms of phase,
    at least one of the bend waveguides of the first path and the bend waveguide of the second path are in a one-to-one correspondence relationship, respectively, and at least one straight waveguide of the first path and the straight waveguide of the second path are in a one-to-one correspondence relationship, respectively,
    the bend waveguide of the second path has the same shape as or an inverted shape of the bend waveguide of the first path, the both waveguides being in a one-to-one correspondence relationship,
    the straight waveguide of the second path has the same shape as the straight waveguide of the first path, the both waveguides being in a one-to-one correspondence relationship,
    the second path and the third path intersect with each other, and
    an intersection angle $\alpha$ at which the second path and the third path intersect with each other is set to a range from 60° to 90°.

2. The 90-degree hybrid according to claim 1, further comprising two input ports connected to the first and second Y-branch couplers, respectively, wherein
    the third path and the fourth path have at least one bend waveguide,
    bend radii of the bent waveguides of the first to fourth paths are the same, and
    a pitch Pi between the two input ports is uniquely determined by a formula $Pi=2r(1-\cos\alpha)+Py$ using the intersection angle $\alpha$, the bend radius r, and a value of a pitch Py between output waveguides of the first and second Y-branch couplers.

3. The 90-degree hybrid according to claim 1, wherein the first coupler and the second coupler are wavelength-independent directional couplers.

4. The 90-degree hybrid according to claim 1, wherein the signal light is a Quadrature Phase Shift Keying (QPSK) signal, and
as the 90-degree hybrid circuit, there are provided: a first 90-Degree hybrid circuit which mixes an X-polarization QPSK signal with the local oscillation light to separate the QPSK signal into a component corresponding to a real part of an electric field of the QPSK signal and a component corresponding to an imaginary part thereof to output; and a second 90-degree hybrid circuit which mixes a Y-polarization QPSK signal and the local oscillation light to separate the QPSK signal into a component corresponding to a real part of an electric field of the QPSK signal and a component corresponding to an imaginary part thereof to output.

5. The 90-degree hybrid according to claim 4, further comprising:
a signaling waveguide for causing a signal light incident upon the 90-degree hybrid to propagate to the first Y-branch coupler; and
a local-oscillation light waveguide for causing a local oscillation light incident upon the 90-degree hybrid to propagate to the second branch coupler, wherein
the signaling waveguide and the local-oscillation light waveguide intersect with each other, and
the first Y-branch coupler and the second Y-branch coupler of the first 90-degree hybrid circuit as well as the first Y-branch coupler and the second Y-branch coupler of the second 90-degree hybrid circuit are arranged in the same order in a predetermined direction.

6. The 90-degree hybrid according to claim 5, wherein in order to cancel out a time delay between the X-polarization QPSK signal and the Y-polarization QPSK signal, a waveguide length of each waveguide through which each of the X-polarization QPSK signal and the Y-polarization QPSK signal propagates and a waveguide length of each waveguide through which the local oscillation light propagates are identical, respectively.

7. The 90-degree hybrid according to claim 1, wherein at least one path of the first to fourth paths includes a first bend waveguide with a rotation angle $+\theta_1$, a first straight waveguide with a length $l_1$, a second bend waveguide with a rotation angle $-\theta_1$, a second straight waveguide with a length h, a third bend waveguide with a rotation angle $-\theta_2$, a third straight waveguide with a length $l_2$, and a fourth bend waveguide with a rotation angle $+\theta_2$.

8. The 90-degree hybrid according to claim 1, wherein among the first to fourth paths, a phase trimming heater is disposed in at least one of the third path and the fourth path.

9. The 90-degree hybrid according to claim 8, wherein in at least one of the first to fourth paths, a straight waveguide with a predetermined length is provided in a part in a section in which the heater is disposed.

10. A 90-degree hybrid comprising:
a planar lightwave circuit (PLC) chip having a planar lightwave circuit; and
a 90-degree hybrid circuit formed within the planar lightwave circuit and mixing a modulated signal light and a local oscillation light to output,
the 90-degree hybrid circuit including:
a first Y-branch coupler branching the signal light;
a second Y-branch coupler branching the local oscillation light;
a first coupler causing interference between one of two signal lights branched by the first Y-branch coupler and one of two local oscillation lights branched by the second Y-branch coupler;
a second coupler causing interference between the other one of two signal lights branched by the first Y-branch coupler and the other one of two local oscillation lights branched by the second Y-branch coupler;
a first path for connecting the first Y-branch coupler and the first coupler and for causing one of the two branched signal lights to propagate therethrough, the first path having at least one bend waveguide and at least one straight waveguide;
a second coupler path for connecting the first Y-branch coupler and the second coupler and for causing the other one of the two branched signal lights to propagate therethrough, the second path having the same number of bend waveguides as the first path and the same number of straight waveguides as the first path;
a third path for connecting the second Y-branch coupler and the first coupler and for causing one of the two branched local oscillation lights to propagate therethrough and
a fourth path for connecting the second Y-branch coupler and the second coupler and for causing the other one of the two branched local oscillation lights to propagate therethrough, wherein
the first path and the second path are configured so as to have the same optical path length,
the third path and the fourth path are configured so that an optical path difference between one of the two branched local oscillation lights and the other one of the two branched local oscillation lights becomes 90 degrees in terms of phase,
at least one of the bend waveguides of the first path and the bend waveguides of the second path are in a one-to-one correspondence relationship, respectively, and at least one straight waveguide of the first path and the straight waveguide of the second path are in a one-to-one correspondence relationship, respectively,
the bend waveguide of the second path has the same shape as or an inverted shape of the bend waveguide of the first path, the both waveguides being in a one-to-one correspondence relationship,
the straight waveguide of the second path has the same shape as the straight waveguide of the first path, the both waveguides being in a one-to-one correspondence relationship, and
among the first to fourth paths, a phase trimming heater is disposed in at least one of the third path and the fourth path.

11. The 90-degree hybrid according to claim 10, wherein in at least one of the first to fourth paths, a straight waveguide with a predetermined length is provided in a part in a section in which the heater is disposed.

12. The 90-degree hybrid according to claim 10, wherein the first coupler and the second coupler are wavelength independent directional couplers.

13. The 90-degree hybrid according to claim 10, wherein the signal light is a Quadrature Phase Shift Keying (QPSK) signal, and
as the 90-degree hybrid circuit, there are provided: a first 90-degree hybrid circuit which mixes an X-polarization QPSK signal with the local oscillation light to separate the QPSK signal into a component corresponding to a real part of an electric field of the QPSK signal and a component corresponding to an imaginary part thereof to output; and a second 90-degree hybrid circuit which mixes a Y-polarization QPSK signal and the local oscillation light to separate the QPSK signal into a component corresponding to a real part of an electric field of the QPSK signal and a component corresponding to an imaginary part thereof to output.

14. The 90-degree hybrid according to claim 13, further comprising:
a signaling waveguide for causing a signal light incident upon the 90-degree hybrid to propagate to the first Y-branch coupler; and
a local-oscillation light waveguide for causing a local oscillation light incident upon the 90-degree hybrid to propagate to the second branch coupler, wherein
the signaling waveguide and the local-oscillation light waveguide intersect with each other, and
the first Y-branch coupler and the second Y-branch coupler of the first 90-degree hybrid circuit as well as the first Y-branch coupler and the second Y-branch coupler of the second 90-degree hybrid circuit are arranged in the same order in a predetermined direction.

15. The 90-degree hybrid according to claim 14, wherein in order to cancel out a time delay between the X-polarization QPSK signal and the Y-polarization QPSK signal, a waveguide length of each waveguide through which each of the X-polarization QPSK signal and the Y-polarization QPSK signal propagates and a waveguide length of each waveguide through which the local oscillation light propagates are identical, respectively.

16. The 90-degree hybrid according to claim 10, wherein at least one path of the first to fourth paths includes a first bend waveguide with a rotation angle $+\theta_1$, a first straight waveguide with a length $l_1$, a second bend waveguide with a rotation angle $-\theta_1$, a second straight waveguide with a length h, a third bend waveguide with a rotation angle $-\theta_2$, a third straight waveguide with a length $l_2$, and a fourth bend waveguide with a rotation angle $+\theta_2$.

* * * * *